Sept. 5, 1939.   J. E. FAY ET AL   2,172,080
WELDING PROCESS AND APPARATUS FOR THIN SHEET METAL
Filed March 24, 1937   3 Sheets-Sheet 2
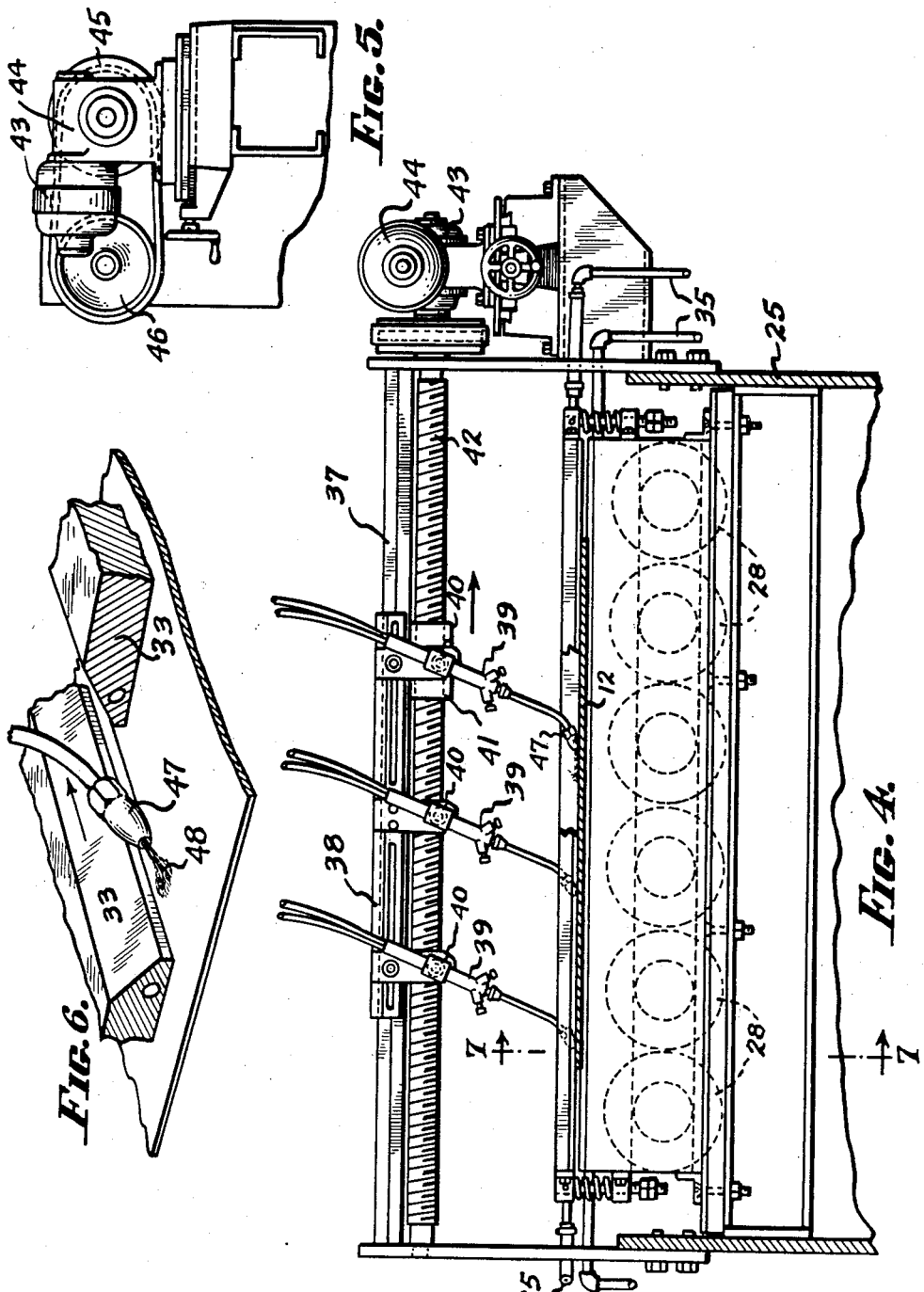
INVENTORS.
JAMES E. FAY
AND ED REED.
BY Allen & Allen
ATTORNEYS.

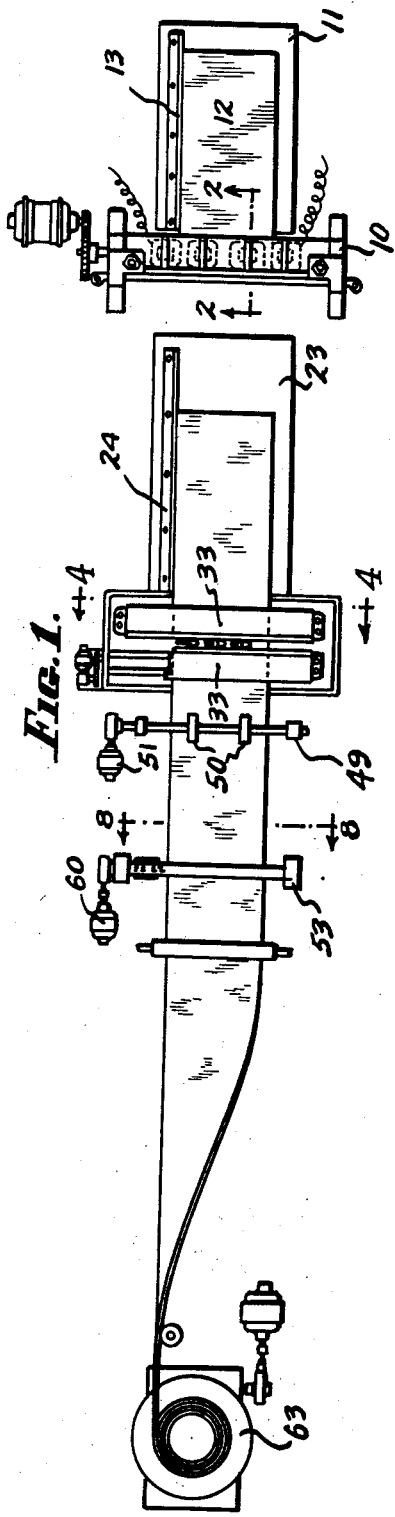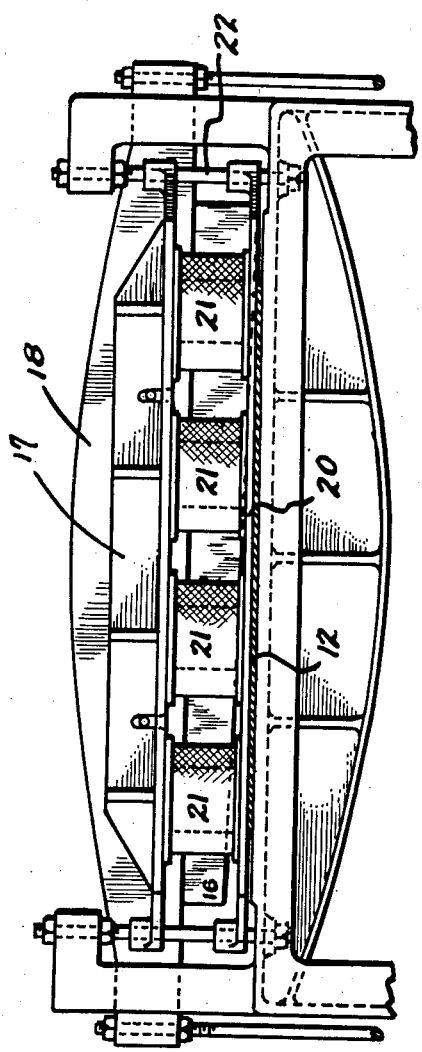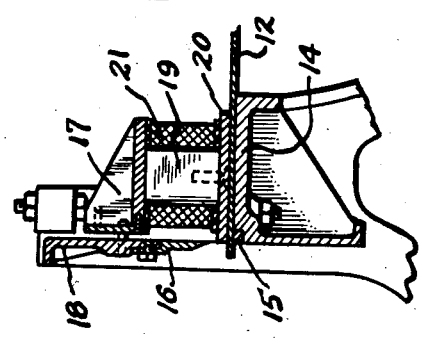

INVENTORS.
JAMES E. FAY
AND ED REED.
BY
Allen & Allen
ATTORNEYS.

Patented Sept. 5, 1939

2,172,080

UNITED STATES PATENT OFFICE 2,172,080

WELDING PROCESS AND APPARATUS FOR THIN SHEET METAL

James E. Fay, Middletown, and Eo Reed, Zanesville, Ohio, assignors to The American Rolling Mill Company, Middletown, Ohio, a corporation of Ohio Application March 24, 1937, Serial No. 132,824

13 Claims. (Cl. 113—59)

Our invention relates especially to the formation of butt welds in thin materials. We have applied it to sheet metal ranging in gauge from say 22 or 24 gauge to 30 gauge and thinner. Our process is of value in welding all thin materials where special precautions have to be taken. In the welding of heavier sheet materials, the special precautions, which form the subject matter of our invention, are not ordinarily necessary, as will be understood by one skilled in the art.

The special problems connected with the welding of thin sheet metal may be stated broadly in this way. (1) There is the problem of butting the sheet ends with an absolutely perfect conformation of the end of one sheet to the end of the next sheet. (2) In welding thin materials by the interfusion of the butted edges, principally where additional metal is not added during the formation of the weld, there are those problems which have to do with the proper control of heat, the proper confining of the molten area of the metal, and the prevention of blow holes and the like. (3) In the welding, especially of certain kinds of thin sheet metal, there is the problem of the protection of the metal from extraneous influences such as oxidation. This is of special importance in the welding of thin silicon steel sheets, where oxidation of the sheets produces not only oxide of iron but also silicon dioxide, which is a refractory material. Our invention is not limited to the welding of silicon steel, but has been employed, and is entirely successful, in the welding of a wide variety of metals, including both magnetic and non-magnetic, ferrous alloys, irons and steels in general and the various non-magnetic metals. We shall, however, describe our invention in connection with a particular exemplary embodiment, which is the welding of thin silicon steel sheets, because in such welding a number of the problems involved are especially difficult. In this exemplary embodiment not only are the various problems mentioned above present, but the purpose is to secure a welded silicon steel strip in which the welds are essentially of the same thickness as the body of the strip. The strip is used for the continuous feeding of punch presses, for example, in the making of transformer cores; and for most purposes, it is quite essential that the space factor of all stamped pieces, including those which contain welds, shall be very good. The welds, therefore, must not be appreciably thicker than the strip itself.

Each of the three problems referred to above is in itself complex. The problem of securing accurately butted ends includes the problem of so cutting the sheets that they may be accurately butted and also includes the problem of so holding the sheets during the welding operation that the accuracy of the contact of the ends of the sheets will not be disturbed either by mechanical forces or by changes in dimension due to temperature. The problem is further complicated by the fact that sheet metal materials in all forms in which they are at present available, or can be made, are characterized by more or less sporadic departures from a true flat plane. Silicon steel is especially devoid of flatness as commercially available. As set forth in the co-pending application of James E. Fay and Eo Reed, entitled Process and apparatus for securing accurately butted sheet ends for welding, filed March 24, 1937, Serial No. 132,825, the only way in which sheets can be sheared and then butted to make a perfect butted joint for welding is by shearing them under exactly the same conditions as will be applied to the sheet ends when the sheets are butted and held for welding. The only way in which this can be accomplished is by both shearing and welding the sheets while clamped under conditions of substantially equal pressure effective over substantially equal areas. A clamping means has to be provided both in connection with a shear for squaring the ends of the sheets and in connection with means employed to hold the sheet ends for welding, and this pressure has to be effective in view of the wavy character of the material over a considerable area inwardly from the ends of the sheets from the sheared line. While we believe that mechanical means of proper form including equalizing means, for example, acting on a set of clamps might be employed, yet we have found that the most convenient and most positive way of clamping the sheets both for shearing and for welding comprises magnetic means as will hereinafter be described.

When it is remembered that in welding this material it is essential to support the sheets as close as possible to the butted ends being welded, so that the supporting and clamping means are subject to the heat of the welding means in large measure, it will be seen that it is necessary to provide some means for preventing a distortion of the sheet ends or of the clamping means which would disturb the accurately butted condition of the sheet ends under the influence of this heat. The problem may be solved by keeping the temperature of the clamping means even throughout their length primarily, and as a second consideration at as low a temperature as is practicable, consistent with the development of the required heat for welding. It will be understood that in the thin gauges of sheets with which we are concerned, where the ends of the sheets project beyond the clamping means, they will be largely controlled as to temperature by the temperature of the clamping means which are, of course, a very much larger mass.

The control of heat during welding can again be considered in several aspects. The problem is (1) one of securing sufficient heat, (2) one of confining the heat to the place where it is required, that is to say particularly confining the area of molten metal close to the butted ends of the sheets so that there is a lessened tendency for holes to form in the weld, (3) the problem of the depth to which the sheet is fused at the butted ends, and (4) the amount of heat required in relation to the thickness of the metal.

The heat may be developed in several ways and aspects of our invention as hereinafter claimed can be employed in connection with widely varying welding procedure, including electric butt welding. We shall describe our invention in connection with welding by means of a flame. In such a welding process, the problems arising are first the manner of application of the flame. In spite of the clamping means there may be some irregularities in the butted ends of the sheets so that it becomes necessary to provide for the application of the heat in conformity with the contour of the butted ends. We accomplish this, when employing a torch as a welding means, preferably by causing the torch to ride on and be guided by the work. Second there is the problem of pressure in the gases in the flame, having in mind particularly the avoidance of any conditions which would tend to blow holes in the weld. We accomplish an effective reduction of pressure by causing the flame to impinge on the metal at an acute angle whereby the impact force of the flame against the molten metal is greatly reduced. We also find that we can cut down the actual pressure needed by proper control and localization of the heat applied.

In connection with the three general problems, we have indicated that we require in many instances protection of the molten metal from oxidation or the like. This can be accomplished in a number of ways, as for example, by the use of torches on both sides of the sheet, which torches create, of course, a neutral or reducing atmosphere; but, since welding is most conveniently done in the horizontal plane and by means of a torch or torches located upon one side of the sheets, we provide means for protecting the other side of the butted sheet ends with an atmosphere preferably derived from the torch or torches used in the welding, although it will be understood that atmospheres otherwise created may be employed without departing from the spirit of our invention. To the end set forth we provide on the side of the sheets opposite the torch or torches a shielding means extending across and beneath the butted ends of the sheets and interspaced therefrom, forming beneath the actual butted ends a shallow channel. This channel becomes filled with gases, or the products of combustion, and protects the weld on the opposite side. The expansion of the gases within the shield, of course, expels any oxidizing atmosphere which may be in it.

The shield is preferably of metal but should be so proportioned and of such material as to tend to cool the weld as little as possible. Whatever material is employed, unless extraneously heated, will tend to withdraw some heat by radiation and conduction; and the various constants heretofore mentioned must be varied in most cases in consideration of the effect of the shielding means used.

We are aware, of course, that others have welded thin sheet materials even including silicon steel. But in former methods the results were either sporadic or imperfect, or the welds were characterized, in places at least, by much greater thickness than the body materials, or the flatness factor was not good, or the control of the various factors in welding required the utmost skill on the part of the operator, and constant watchfulness and variation, or, in a manner of speaking, brute force means were employed in an attempt to overcome unfavorable conditions. The butt-welding of very thin metal pieces has been recognized in the art as an extremely delicate operation involving the utmost in human control. It is an object of our invention to provide means and a method for so standardizing and controlling the various factors involved, that the actual welding does not require great skill, and can actually be carried on by automatically acting means, with, of course, very much more uniform results. Thus, in the practice of our invention, we have found that if we are able to secure an accurately butted condition at the sheet ends when welding, and if we are able to confine by the means set forth the area of molten metal close to the butted sheet ends while assuring adequate atmospheric protection for the weld, it is a comparatively simple matter, well within the skill of the worker in the art, to control the interspacing of the clamps, the cooling of the clamps, the conformation and size of shield, and the intensity and the pressure of the flame in accordance with the gauge of the materials being welded to secure adequate commercial welds.

In the practice of our invention, we prefer to use a plurality of torches instead of one in order to increase the speed of the operation; and we prefer to impinge the flame of these torches at an acute angle against the work, and to move the torch in a direction opposite to the direction of movement of the gases in the flame. This enables us more readily to cause the torches to ride on the work and also produces an annealing effect on the weld due to the relatively slow cooling after any given part of the weld has passed the most intense portion of the flame.

The objects of our invention will be clear from the foregoing or will be pointed out hereinafter; and these objects we accomplish by that certain structure and arrangement of parts and in that certain method of which we shall now describe the aforesaid exemplary embodiment. For clarity, reference is now made to the drawings wherein Figure 1 is a plan view of an apparatus for making continuous strip material from individual sheets or strips of metal.

Fig. 2 is a cross sectional view taken along the lines 2—2 of Fig. 1, showing a form of shear which we employ.

Fig. 3 is a front elevation of the said shear.

Fig. 4 is a front elevation of an exemplary welding mechanism taken along the lines 4—4 of Fig. 1, with one of the clamping means broken away in part.

Fig. 5 is an end elevational view of a means for moving the torch or torches.

Fig. 6 is a fragmentary perspective view showing the relation of one of the torches to the metal being welded.

Figure 7:
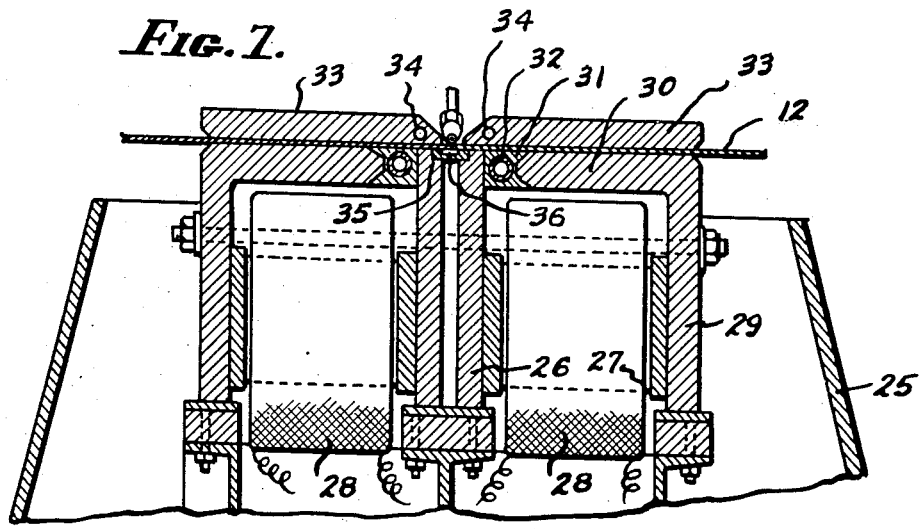
Fig. 7 is a sectional view across the welding apparatus taken along the lines 7—7 of Fig. 4.

As has been already indicated we provide for the securing of accurately butted ends in thin sheet material and especially thin sheet material not characterized by flatness, and to this end we shear the sheet ends for butting under conditions identical to those under which the sheet ends are clamped during a welding operation. It will be appreciated that with a sheet not characterized by flatness, the conformation of its end will be changed by the degree to which the sheet is flattened out under pressure. Clamping has to be employed both for shearing and for welding; and it is essential in our process that the clamping means for both of these purposes have an identical effect in flattening the sheet. In Fig. 1 we have shown a shear 10, provided with a table 11 upon which the sheet or strip 12 may be caused to rest. The table has a guide 13. The shear as shown in Fig. 2 has a shear table 14, a fixed knife 15 and a movable knife 16 actuated under power in the usual way. The shear is provided with a magnetic hold-down or clamping means preferably. As we have indicated, we prefer to use magnetic hold-down means because the pressure exerted by such means can be very much more accurately and simply controlled. Our invention however, is not limited to the use of such clamping means, because carefully controlled mechanical, hydraulic or other clamping means may be employed if desired, providing the identical conditions can be reproduced in the welding machine. In the particular magnetic clamping means here disclosed, a bridge member 17 is connected by a suitable lost motion connection with the shear head 18, which bears the movable knife. Core members 19 are attached to the bridge 17 and the lower ends are connected with a clamping member 20. Coils 21 surround the core members 19. Preferably the bridge and the clamping member are slidably mounted as shown in Fig. 3 on rods or other suitable means 22.

Suitable electrical connections are made to the various coils 21. In the operation of the device, as soon as the shear has been started into operation for the formation of a cut, the clamping means comes down against the sheet 12 and the magnets are energized whereby the sheet is held with a great and accurately controlled force against the table 14 during the shearing stroke. At the conclusion of the shearing stroke, the movable knife is raised and the magnets are de-energized so that the movable head 18, acting through the bridge 17, can raise the clamping means from the sheet to permit its withdrawal.

The force applied to the magnetic clamping means can be controlled in any way desired either automatically or manually. The purpose is to clamp the sheet under conditions which are identical with the conditions under which it will be clamped during welding. Two factors are of importance here: first, the factor of pressure as determined by the electric power applied to the magnets; second, the factor of area which is determined by the width of the clamping member 20. These factors again should be duplicated in the welding apparatus. We have found that a wide area of the clamping means is advisable; and in current practice, we are employing clamping means eight inches wide, although we have successfully used both narrower and wider clamping means.

When handling individual sheets, it is usual to shear one end of a series of sheets individually, stacking the sheets as they are sheared. Afterwards the stack is turned end for end, so that the other end of the sheets may be sheared under the same conditions and after the second shearing the sheets are passed individually to the welding means.

We have shown a table 23 over which the sheets may be passed to the welding means and preferably provided with a guide 24. At the welding point the sheets will be clamped in accurately butted relationship under the same conditions as obtained during the shearing. Our invention is not limited to a procedure involving welding in the horizontal position, although we shall describe it in such an embodiment. It is a matter of convenient practice to weld horizontally with the welding torches located above the butted sheet ends. We therefore preferably locate the bulk of the electro-magnetic clamping means below the plane of the sheets and provide thereabove, relatively thin clamping members held down magnetically. Such an organization of parts is shown in section in Fig. 7 where, suitably mounted on the base 25 of the welding device, there are two sets of clamping means, one for the trailing end of the strip which is being formed by welding, and the other for the leading end of sheets or strips to be attached thereto. Each of the clamping means comprises a pole piece 26, a core member 27 about which there is a coil 28 and another pole piece 29. This latter pole piece has its upper end bent over as at 30 to form a pole extension. A non-magnetic mass 31 is preferably positioned between the upper end of the pole piece 26 and the approaching end of the pole extension 30. This mass may be a mass of copper deposited in the space between the two pole members by welding or otherwise. For a purpose hereinafter to be described the mass 30 is either perforated or provided with an interior tube 32. The tops respectively of the pole piece 32, the mass 31, and the pole extension 30 are planed smooth. The sheet 12 overlies this surface, and upon energization of the coil 28 is firmly clamped to this surface with the aid of a clamping shoe 33. This shoe is preferably provided with a longitudinal edge perforation 34. The other clamp shown in Fig. 7 is the same as the one previously described, excepting that it is oppositely disposed and faces the first clamp.

As a theoretical consideration, it will be apparent that if sheets are flattened out to a given degree under a given pressure over a given area, then have their ends sheared, these ends may be butted together accurately, providing the sheets are flattened out to the same degree when their ends are butted, under the same pressure effective over the same area. Under these circumstances the ends of the sheet should exactly conform one to another. However, considerations of temperatures arise here and it will be apparent that the accuracy of the butting of the sheet edges can be disturbed by unequal temperatures.

Thus for example if the central portions of the sheet ends are heated to a substantially higher temperature than the sidewise portions thereof, the sheared ends of the sheets will tend to assume a convex configuration which prevents accurate butting. As a consequence, means must be provided for preventing an uneven heating of the sheet ends such as would disturb the desired relationship thereof. Unequal heating might result either from the welding operation itself or might result from unequal latent heat in the clamping members derived from a preceding welding operation. As a consequence we have provided the means 32 and 34 hereinabove described, for controlling the temperature of the clamping means and preventing inequalities in temperature. Suitable connections for a cooling medium such for example, as water, are made to the perforations or passageways 32 and 34 and such connections are shown at 35 in Fig. 4. A suitable cooling medium will, of course, be supplied and/or withdrawn by appropriate means, not shown.

The cooling of the clamping means serves also another function in this: that it confines the heat developed by the welding means to an area very closely adjacent to the actual butted ends of the sheets. The factors which have to do with this matter are the degree of cooling of the clamping means, the distance apart of the clamping means, and the gauge or thickness of the materials being welded. But it will be seen that it will be well within the skill of the worker in the art to vary the distance apart of the clamping means and the degree to which these are cooled in accordance with the gauge of the material being operated upon. For heavier materials, the clamps may be further apart and may be more drastically cooled. However, it will be clear that once a satisfactory adjustment has been made for any given gauge of material, the factor left for control is the factor of heat applied during the welding operation. In other words, the welding operation has been simplified to the extent essentially of leaving a single factor variable at this point.

However, as has previously been stated, for the welding of certain materials notably silicon steel, the molten metal during welding has to be rigorously protected from oxdation. This may be done in several ways as by providing on the under side of the weld an atmosphere of non-reactive character artifically produced, or by locating welding torches on both sides of the butted edges of the sheets, or in other ways. It is most convenient we find, to provide a shield on the side of the weld opposite the torch or torches which shield provides a narrow channel adapted to be filled with gases or products of combustion from the welding torches, which gases pass between the butted edges of the sheet ahead of the weld. As a consequence we have shown in Fig. 7 a shield member 35 grooved to present a narrow channel 36 beneath the actual butted ends of the material to be welded. In our experience, this forms an adequate means of protection when welding from one side only with a torch. The channel 36 becomes filled with non-oxidizing gases from the torches, although it will be apparent that a non-oxidizing gas otherwise derived could be artificially passed into and through the channel if desired.

However, it will be clear that the use of the member 35 affects the heat conditions at the weld to some extent, for the most part by radiation but also in some degree by conduction. For convenience one desires to approximate the heat conditions one would have if there were no shield. As a consequence, it is well to use for the shield a substance having a low specific heat but it will be within the skill of the worker in the art readily to apportion the rate of cooling of the clamping members and their distance apart for any given thickness of material being operated on, in view of the modification of the heat conditions produced by the shield member 35; what we wish to make clear is that the shield member 35 does have an effect upon the heat conditions at the weld and must be taken into account. For welding materials which do not require protection, the shield member 35 may be eliminated.

Reference to Figs. 4 and 5 will indicate the general arrangement of an exemplary welding mechanism. Here, upon the frame 25 of the welding machine, there is a bridge 37 overlying the butted sheet edges and the clamping members. A carriage 38 rides along this bridge and to the carriage one or a plurality of torches 39 may be pivoted as at 40. The carriage may be moved along the bridge 37 by means of the threaded engagement of a nut 41 fastened to the carriage with a threaded shaft 42 which is driven. In the particular embodiment a motor 43, through a gear box 44, drives a sheave 45 which is belted to a sheave 46 on the shaft 42, it will be understood that this mechanism has been shown somewhat diagrammatically and for exemplary purposes only of mechanisms which may be employed. Other types of carriage and other types of driving mechanism therefore, are entirely suitable.

When operating with thin sheets it is essential that the heat conditions be very carefully controlled and regulated. It is also advisable to keep down the pressure of the gases as they come out of the welding tip to as low a value as is consonant with the development of the required degree of heat. We have found that we can greatly reduce the apparent or effective pressure of the flame by causing the flame to impinge sidewise or aslant against the weld. Thus in Fig. 6 we have shown a welding tip 47 of a size adapted to lie between the edges of the clamping means 33 and adapted to direct the flame 48 at an acute angle to the work, whereby there is a very much lessened tendency to blow holes in the weld. The torch, during the welding operation is moved in the direction of the arrows in Figs. 4 and 6, i. e., backwards and away from the molten metal. This is important for several reasons. In the first place we desire to maintain always the same relationship between the flame and the work. With materials characterized by some lack of flatness, and even with accurately butted edges secured as hereinabove described, there may be some irregularities in the plane of the butted sheet edges. As a consequence, we allow our torch tips to follow and ride upon the actual edges being welded. This is the reason why we have pivoted our torches as at 40, although other means permitting the torches to ride upon the work could be employed. This again indicates a reason for moving the torches backwards, since the torches are in this way caused to ride upon fresh portions of the sheet edges. They do not ride upon the weld. Another reason for moving the torch backwards is to provide for an annealing effect. The molten pool of metal in the weld follows the torch, but beyond this there extends an envelope of hot gases at a somewhat lower temperature, which has an annealing effect upon the weld and prevents too rapid cooling.

The reason why we use a plurality of torches by preference, is to shorten the length of time of the welding operation. One torch may be used; and if more are employed, their number is not critical excepting in this, that the torches have to be far enough apart to prevent interference, depending upon the size of the flame and the pressure of gas used. By proper control of the various factors having to do with the localization of the heat, we have found it possible to operate at very low gas pressures in the torch tips and we have found substantially no tendency toward blowing holes in the weld.

In forming a weld, it is usual to clamp first the trailing end of the strip already formed, afterwards bringing up the leading end of a strip of sheet and clamping it in position. The torches meanwhile have been swung up. They are then lighted either manually or automatically at one terminus of the butted sheet and the torch or torches are rapidly traversed across the butted ends for the required distance. If one torch is employed, it is obvious that this must be carried all along the line of the weld. If a plurality of torches are employed the distance which each torch must move is diminished by the number of torches. When the sheet edges are properly clamped, the torches are lighted either manually or automatically and are swung down in a position in which they ride along the work. This assures an identical relationship of the flame to the work at all times and in spite of any inequalities in the work. The formation of the weld proceeds rapidly.

Figure 8:
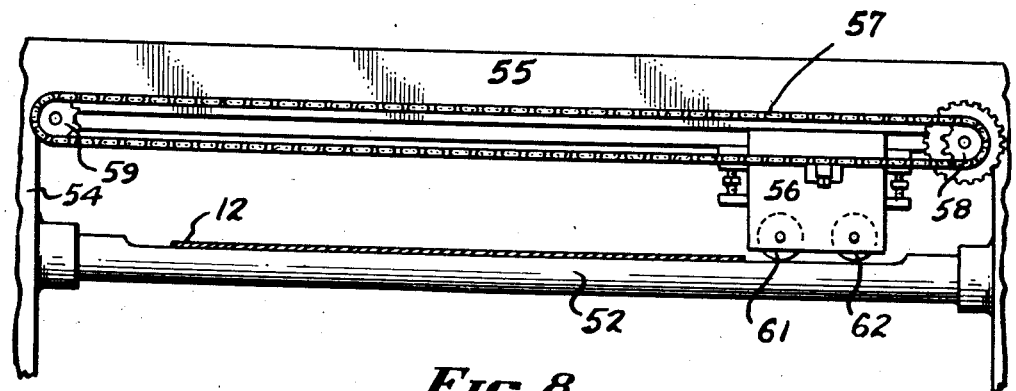
Fig. 8 is an elevational view of a means for rolling the weld taken along the lines 8—8 of Fig. 1.

As soon as the weld has been formed the strip may be moved along. This is conveniently accomplished by means illustrated at 49 in Fig. 1 and comprising essentially interspaced pinch roll means 50, driven in any suitable way, as by means of a motor 51. The operation of this device or any other movement means is preferably to carry the welded joint from the welding device and position it on the anvil 52 of a weld rolling device, indicated generally at 53, in Fig. 1 and shown in detail in Fig. 8. This device comprises a suitable framework 54, upon which the anvil 52 is mounted, and which has an upper bridge 55. A carriage 56 slides along this bridge under the influence of a chain 57 passing over sprockets 58 and 59 at the ends of the device. A motor 60 is provided to drive these sprockets first in one direction and then in another. The carriage is thus moved across the width of the strip 12 and back again as one cycle. The carriage bears rolls 61 and 62, the purpose of which is to roll and flatten the weld. The carriage is preferably so constructed that during any particular traverse the leading roller is the one which does the rolling.

This device is employed to insure perfect flatness in the weld. In many instances, its function is an unnecessary one. Moreover, other means of working the weld may be employed where any working is necessary.

To complete the apparatus, we have indicated diagrammatically at 63 in Fig. 1 a coiling device. This may be any desired; but with many materials we prefer to use the coiling means and method set forth in the co-pending application of Ralph E. Asbury and Eo Reed, filed March 24, 1937, Serial No. 132,826, and entitled Process and apparatus for coiling strip material.

By the means and method described, we have provided an entirely satisfactory, simple and convenient means of making butt welds in very thin sheet materials, especially in sheet materials which are not characterized by flatness, and also in particular materials which are exceedingly difficult to weld and require especial protection such, for example, as silicon steel. By the mechanism and procedure set forth, we have accomplished our objects by providing for the accurate butting of sheet edges, by providing for the maintenance of this accurately butted condition, by confining the highest heat essentially to the line of the butted edges and by controlling heat dissipation while affording where necessary, atmospheric protection to the weld. We have made all of these factors matters of initial adjustment in connection with any particular gauge of material being welded. We have further provided means whereby the relationship of the flame to the work at all times is maintained constant. In this way we have disposed of the great multitude of variable factors which hitherto have made it extremely difficult to secure consistent results in the welding of very thin materials. This leaves only the matter of the adjustment of the actual heat applied, a matter which is well within the skill of the worker in the art to do, since the other factors have been eliminated as such. As a consequence the ordinary worker in the art, or even automatically acting apparatus, can consistently produce satisfactory and even welds in thin materials.

It will be understood that modifications in the various elements of the apparatus may be made without departing from the spirit of our invention. Having thus set forth our invention, what we claim as new and desire to secure by Letters Patent is:

1. A process of butt welding thin sheet material which comprises securing an accurately butted condition of the sheet ends while said sheet ends are clamped for welding, and welding said sheet ends with a torch which is moved along the butted ends and causing said torch to ride on said butted ends by supporting the torch on the work at a point closely adjacent the orifice of the torch, whereby to maintain the same relationship between the flame and the butted ends of the sheet in spite of irregularities in the work.

2. A process of butt welding thin sheet material which comprises securing an accurately butted condition of the sheet ends while said sheet ends are clamped for welding, and welding said sheet ends with a torch which is moved along the butted ends and causing said torch to ride on said butted ends by supporting the torch on the work at a point closely adjacent the orifice of the torch, whereby to maintain the same relationship between the flame and the butted ends of the sheet in spite of irregularities in the work, and cutting down the effective pressure of the gases in said flame by causing said flame to impinge against said work at an acute angle.

3. A process of butt welding thin sheet material which comprises securing an accurately butted condition of the sheet ends while said sheet ends are clamped for welding, and welding said sheet ends with a torch which is moved along the butted ends and causing said torch to ride on said butted ends by supporting the torch on the work at a point closely adjacent the orifice of the torch, whereby to maintain the same relationship between the flame and the butted ends of the sheet in spite of irregularities in the work, cutting down the effective pressure of the gases in said flame by causing said flame to impinge against said work at an acute angle, and moving said torch with respect to said work away from the molten metal formed by said flame.

4. A process of forming butt welds in thin sheet material which comprises shearing the ends of thin sheet or strip and clamping said ends in butted relationship for welding, using for shearing and for welding substantially the same clamping pressures effective over substantially the same areas of said sheet material, and welding said butted edges by means of a torch while causing said torch to ride on and follow the work being welded, by supporting the torch on the work at a point closely adjacent the orifice of the torch.

5. A process of forming butt welds in thin sheet material which comprises shearing the ends of thin sheet or strip and clamping said ends in butted relationship for welding, using for shearing and for welding substantially the same clamping pressures effective over substantially the same areas of said sheet material, welding said butted edges by means of a torch while causing said torch to ride on and follow the work being welded, by supporting the torch on the work at a point closely adjacent the orifice of the torch and while protecting the weld on the opposite side by means of a non-oxidizing atmosphere.

6. In combination in a welding installation a shear having hold-down means and a welding mechanism having clamping means adapted to receive, for welding, material sheared by said shear, said hold-down and clamping means arranged to exert the same pressures effective over the same areas on said strip or sheet material, and means for welding said sheet or strip material in said welding mechanism while so clamped in butted relationship, said means comprising a torch having a tip adapted to ride upon the work being welded, mounting means for said torch whereby said tip may follow said work, and means for moving said torch in a direction opposite to the direction of the flame thereof.

7. In combination in a welding installation a shear having hold-down means and a welding mechanism having clamping means adapted to receive, for welding, material sheared by said shear, said hold-down and clamping means arranged to exert the same pressure effective over the same areas on said strip or sheet material, and means for welding said sheet or strip material in said welding mechanism while so clamped in butted relationship, said means comprising a torch having a tip adapted to ride upon the work being welded, mounting means for said torch whereby said tip may follow said work, and means for moving said torch in a direction opposite to the direction of the flame thereof, and means for cooling said clamping means sufficiently to prevent inequalities of temperature disturbing the butted relationship of the ends of the material to be welded, and whereby to confine the heat of the welding substantially to the line of the butted edges.

8. In combination in a welding installation a shear having hold-down means and a welding mechanism having clamping means adapted to receive, for welding, material sheared by said shear, said hold-down and clamping means arranged to exert the same pressure effective over the same areas on said strip or sheet material, and means for welding said sheet or strip material in said welding mechanism while so clamped in butted relationship, said means comprising a torch having a tip adapted to ride upon the work being welded, mounting means for said torch whereby said tip may follow said work, means for moving said torch in a direction opposite to the direction of the flame thereof, and means for cooling said clamping means sufficiently to prevent inequalities of temperature disturbing the butted relationship of the ends of the material to be welded, whereby to confine the heat of the welding substantially to the line of the butted edges, and means for providing on the reverse side of said weld a protective non-oxidizing atmosphere.

9. In combination a shear having hold-down means and a welding mechanism having clamping means, said hold-down and clamping means arranged to exert the same pressure effective over the same areas on strip or sheet material adapted to be butted and welded, and means for welding said sheet or strip material in said welding mechanism while so clamped, said means comprising a torch having a tip adapted to ride upon the work being welded, mounting means for said torch whereby said tip may follow said work, means for moving said torch in a direction opposite to the direction of the flame thereof, and means for cooling said clamping means sufficiently to prevent inequalities of temperature disturbing the butted relationship of the ends of the material to be welded, whereby to confine the heat of the welding substantially to the line of the butted edges, and means for providing on the reverse side of said weld a protective non-oxidizing atmosphere, said means comprising a protective shield having a channel underlying the butted edges of the material to be welded and adapted to confine a non-oxidizing atmosphere from said torch.

10. A process of welding thin silicon steel sheet material which comprises shearing said sheet material and butting the ends thereof for welding under conditions of identical clamping pressure effective over identical areas of said sheet material whereby to secure accurately butted edges, maintaining the accuracy of the said butted relationship by preventing inequalities in the temperature of the clamping means, cooling the clamping means to confine the heat of welding substantially to the butted sheet ends and proportioning the degree of cooling and the position of the clamping means to the gauge of the material being operated upon, and then applying to the butted ends of the material heat for interfusing said ends, and proportioning the degree of heat to the gauge of the material being operated upon and the heat abstracted from the butted ends by the clamping means.

11. A process of forming butt welds in thin silicon steel not characterized by flatness which comprises shearing the ends of thin silicon steel sheet or strip material and clamping said material above and below and closely adjacent the butted ends, using for shearing and for welding substantially the same clamping pressures effective over substantially the same areas of said material, and confining the heat of the weld substantially to the actual butted ends by cooling the clamping means to such an extent as to maintain the material without heat distortion at all points, and applying sufficient heat to said butted ends so as to interfuse said ends in spite of said cooling.

12. In combination in a welding installation, a shear having knives and hold-down means closely adjacent said knives, and a welding mechanism having clamping means adapted to receive, for welding, strip or sheet material sheared by said shear, said hold-down and clamping means arranged to exert the same pressures effective over the same areas on said strip or sheet material, and means for welding said strip or sheet material in said welding mechanism while so clamped in butted relationship, said means comprising a torch, and means for moving said torch along the line of the butted edges of said material.

13. In combination in a welding installation, a shear having knives and hold down means closely adjacent the shear knives, and a welding mechanism having clamping means adapted to receive, for welding, sheet or strip material sheared by said shear, said hold down and clamping means arranged to exert the same pressures effective over the same areas of said sheet or strip material, and torch means for welding said sheet or strip material in said welding mechanism while so clamped in butted relationship.

JAMES E. FAY.
EO REED.